(12) United States Patent
Pickholz et al.

(10) Patent No.: US 9,239,600 B2
(45) Date of Patent: Jan. 19, 2016

(54) METHOD AND SYSTEM FOR SUPPLYING POWER TO MULTIPLE VOLTAGE ISLANDS USING A SINGLE SUPPLY SOURCE (SSS)

(75) Inventors: Ariel Pickholz, Even Yehuda (IL); Long Nguyen, Irvine, CA (US); Shay Mizrachi, Hod HaSharon (IL)

(73) Assignee: Broadcom Corporation, Irvine, CA (US)

( * ) Notice: Subject to any disclaimer, the term of this patent is extended or adjusted under 35 U.S.C. 154(b) by 917 days.

(21) Appl. No.: 13/433,868

(22) Filed: Mar. 29, 2012

(65) Prior Publication Data

US 2012/0181863 A1    Jul. 19, 2012

Related U.S. Application Data

(63) Continuation of application No. 11/960,384, filed on Dec. 19, 2007, now Pat. No. 8,212,392.

(60) Provisional application No. 60/889,420, filed on Feb. 12, 2007.

(51) Int. Cl.
*H02J 1/10* (2006.01)
*H02J 9/00* (2006.01)
*G06F 1/32* (2006.01)
*G06F 1/26* (2006.01)

(52) U.S. Cl.
CPC ... *G06F 1/26* (2013.01); *G06F 1/32* (2013.01); *H02J 9/00* (2013.01); *Y10T 307/344* (2015.04); *Y10T 307/391* (2015.04); *Y10T 307/461* (2015.04); *Y10T 307/469* (2015.04)

(58) Field of Classification Search
CPC .................................... H02J 9/00; G06F 1/32
USPC ........................... 307/23, 29, 38, 39; 713/330
See application file for complete search history.

(56) References Cited

U.S. PATENT DOCUMENTS

| | | | |
|---|---|---|---|
| 6,601,180 B1 * | 7/2003 | Paredes et al. | 713/323 |
| 6,691,239 B1 | 2/2004 | Rose | |
| 6,768,225 B2 | 7/2004 | Chang | |
| 7,099,135 B2 | 8/2006 | Ball et al. | |
| 7,454,642 B2 | 11/2008 | Bernstein et al. | |
| 7,468,626 B2 | 12/2008 | Hoshi et al. | |
| 7,595,569 B2 | 9/2009 | Amerom et al. | |
| 7,831,843 B2 * | 11/2010 | Brundridge et al. | 713/300 |
| 8,212,392 B2 * | 7/2012 | Pickholz et al. | 307/38 |
| 2005/0248215 A1 | 11/2005 | Rosa | |

* cited by examiner

*Primary Examiner* — Hal Kaplan
(74) *Attorney, Agent, or Firm* — Oblon, McClelland, Maier & Neustadt, L.L.P.

(57) ABSTRACT

Methods and systems for supplying power to multiple voltage islands using a single supply source are disclosed. Aspects of one method may include providing power to a first of a plurality of voltage islands, and individually controlling providing of power to each of a remaining portion of the plurality of voltage islands. For example, when an electronic system is first powered on, a low current voltage source may be used to supply power to a primary voltage island. As a higher current voltage source becomes available, power derived from the higher current voltage source may be provided to the primary voltage island and to secondary voltage islands. Power to each of the secondary voltage islands may be, for example, individually controlled via a power MOS transistor. The power MOS transistor may also be configured to allow a faster blocking time than unblocking time.

20 Claims, 10 Drawing Sheets

METHOD AND SYSTEM FOR SUPPLYING POWER TO MULTIPLE VOLTAGE ISLANDS USING A SINGLE SUPPLY SOURCE (SSS)

CROSS-REFERENCE TO RELATED APPLICATIONS/INCORPORATION BY REFERENCE

This application is a continuation of U.S. application Ser. No. 11/960,384, filed Dec. 19, 2007 which makes reference to, claims priority to, and claims the benefit of U.S. Provisional Application Ser. No. 60/889,420, filed Feb. 12, 2007.

The above stated applications are hereby incorporated herein by reference in their entirety.

FIELD OF THE INVENTION

Certain embodiments of the invention relate to power generation and distribution. More specifically, certain embodiments of the invention relate to a method and system for supplying power to multiple voltage islands using a single supply source.

BACKGROUND OF THE INVENTION

Power consumption is very important in many electronic devices, especially in mobile devices, which have very limited battery power. However, even for those electronic devices that are not powered by batteries, power conservation may be optimized. This may allow, for example, marketing advantages as an "energy saver" device. Many electronic devices may have multiple subsystems, and some of these subsystems may require power at different times. Accordingly, multiple power sources may be utilized to provide power to each of the multiple subsystems. This may comprise additional circuitry and heat generation, which may increase power consumption and overall system cost.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for supplying power to multiple voltage islands using a single supply source, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for supplying power to multiple voltage islands using a single supply source. Aspects of the invention may comprise supplying power to a first of a plurality of voltage islands, and individually controlling a manner in which power may be supplied to each of a remainder of the plurality of voltage islands. For example, when an electronic system is first powered on, a low current voltage source may be used to supply power to a primary voltage island. As a higher current voltage source becomes available, power derived from the higher current voltage source may be provided to the primary voltage island and to secondary voltage islands. Power to each of the secondary voltage islands may be, for example, individually controlled.

The individual control of the power may comprise, for example, blocking and unblocking of the voltage, which may be achieved via, for example, a power MOS transistor. The power MOS transistor may be configured to allow a faster blocking time than unblocking time. This may reduce current demand when the secondary voltage islands are provided with power, and also reduce the amount of time when voltage islands may be supplied with under-voltage power. While the voltage islands may be supplied with a common voltage, each of the voltage islands may also be supplied with different voltages if those voltages are available.

Figure 1:
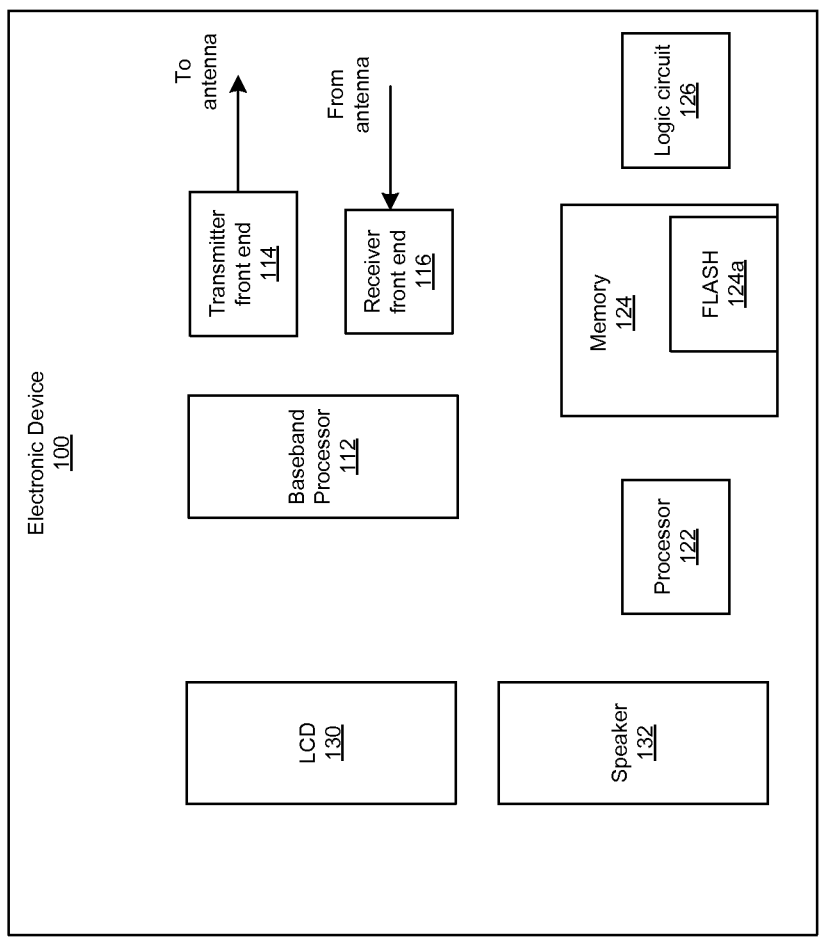
FIG. 1 is an exemplary block diagram of a portion of an electronic device, which may be utilized in connection with an embodiment of the invention.

FIG. 1 is an exemplary block diagram of a portion of an electronic device, which may be utilized in connection with an embodiment of the invention. Referring to FIG. 1, there is shown an exemplary electronic device 100 that may comprise a baseband processor 112, a transmitter front end 114, a receiver front end 116, a processor 122, a memory block 124, and a logic circuit block 126. The memory block 124 may comprise, for example, a FLASH memory block 124a. The electronic device 100 may also comprise, for example, various input/output devices such as the video display 130, which may be a LCD, and an audio speaker 132.

The baseband processor 112 may comprise suitable circuitry, logic, and/or code that may enable processing of digital data for transmission. The processing may comprise, for example, digital filtering, modulation of a baseband signal using the appropriate modulation scheme, and/or converting the baseband signal to an analog signal. The output of the baseband processor 112 may be communicated to, for example, the transmitter front end 114. An exemplary modulation scheme may comprise quadrature phase shift keying (QPSK). The baseband processor 112 may also process signals received by the electronic device 100 to demodulate a baseband signal received from the receiver front end 116. Processing the received signals may comprise, for example, processing the analog baseband signal received from the receiver front end 116 to an audio signal suitably amplified for output via the audio speaker 132. The baseband processor 112 and/or the processor 122 may, for example, process video signals for display to the video display 130.

The transmitter front end 114 may comprise suitable circuitry and/or logic that may enable filtering, and/or amplification of analog signals, and/or conversion of analog baseband signals to RF signals suitable for transmission. Since the RF transmission frequency may vary depending on the frequency used by a base station, an output frequency of a local oscillator used for upconverting analog signals to RF signals may also be variable. The transmitter front end 114 may also comprise filters and/or power amplifiers that may provide a specific power level for the RF signal.

The receiver front end 116 may comprise suitable circuitry and/or logic that may enable filtering, and/or amplification of received analog signals, and/or conversion of RF signals to analog baseband signals. The receiver front end 116 may comprise, for example, a low noise amplifier that may enable amplification of low power signals that may be received. The receiver front end 116 may also comprise variable gain amplifiers that may be used to further amplify signals amplified by the low noise amplifiers. Since the received RF frequency may vary according to a base station, an output frequency of a local oscillator used for downconverting RF signals to analog signals may also be variable. The receiver front end 116 may also comprise filters that may be used to attenuate unwanted frequency components of the received signals.

The processor 122 may control the operation of the device 100. For example, the processor 122 may be utilized to update and/or modify programmable parameters and/or values in a plurality of components, devices, and/or processing elements in the baseband processor 112, the transmitter front end 114, and/or the receiver front end 116. The processor 122 may determine the mode of operation of the transmitter front end 114. For example, the processor 112 may select a specific frequency for a local oscillator, or a specific gain for a power amplifier. Moreover, the specific frequency selected and/or parameters needed to calculate the specific frequency, and/or the specific gain value and/or the parameters needed to calculate the specific gain, may be stored in the memory block 124 by the processor 112.

Similarly, the processor 122 may determine a mode of operation of the receiver front end 116. For example, the processor 122 may select a specific frequency for a local oscillator, or a specific gain for a variable gain amplifier. Moreover, the specific frequency selected and/or parameters needed to calculate the specific frequency, and/or the specific gain value and/or the parameters needed to calculate the specific gain, may be stored in the memory block 124 by the processor 122.

The information stored in memory block 124 may be transferred to the transmitter front end 114 from the memory block 124, by, for example, the processor 122. The memory block 124 may comprise suitable logic, circuitry, and/or code that may be adapted to store a plurality of control and/or data information, including parameters needed for calculation of frequencies and/or gain. The memory block 124 may also comprise a FLASH memory block 124a that may be used to store various code and/or data.

The logic circuit block 126 may comprise suitable logic, circuitry, and/or code that may be used to generate control and/or status signals. The control and/or status signals may be generated using, for example, state machines. The various circuits of the electronic device 100 may require power for operation, and the power may be provided at different times. For example, power that is limited in current capacity may be initially provided to the processor 122 for booting the electronic device 100 upon power up. As higher current power becomes available from a power supply (not shown), power may be provided to other circuitry.

Figure 2:
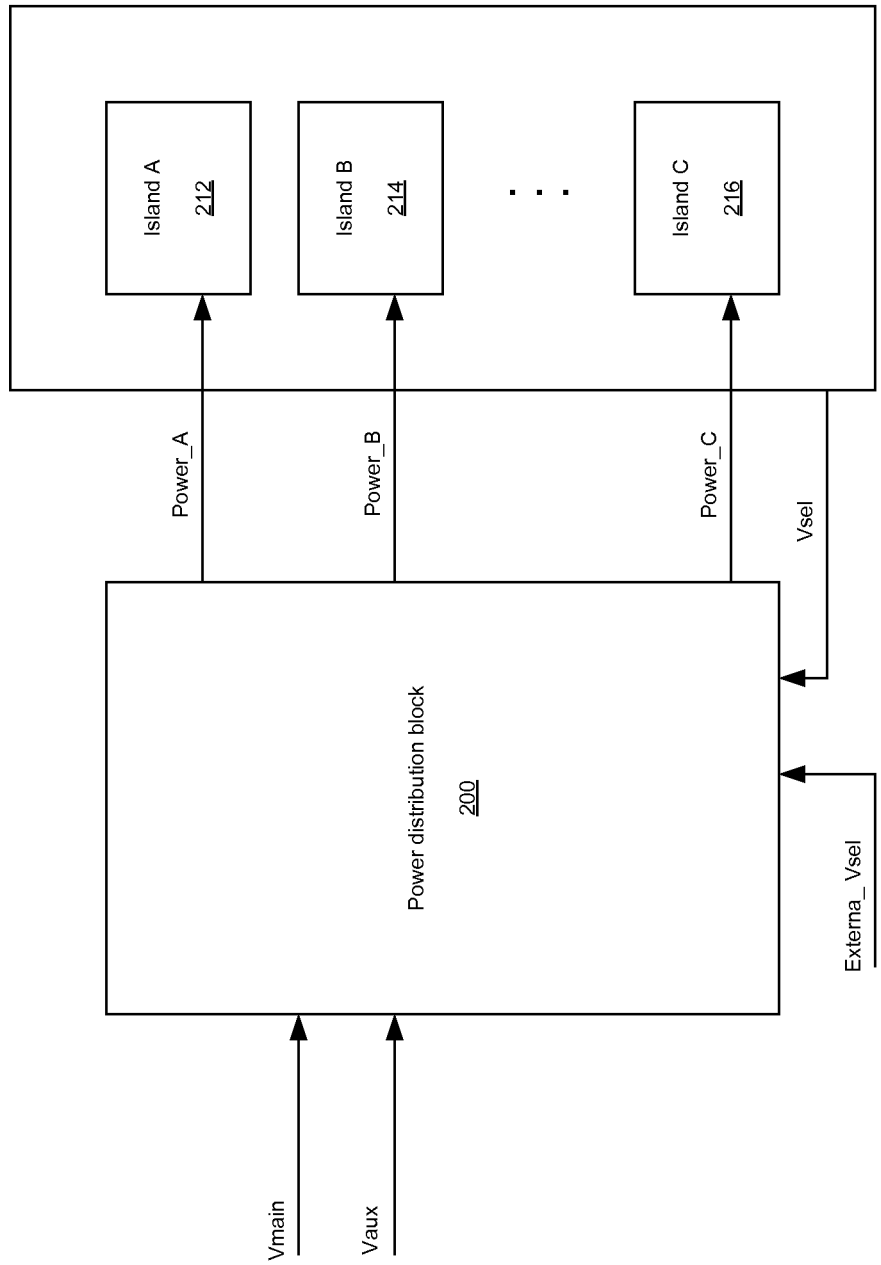
FIG. 2 is a block diagram of an exemplary power distribution system comprising a single supply source, in accordance with an embodiment of the invention.

FIG. 2 is a block diagram of an exemplary power distribution system comprising a single supply source, in accordance with an embodiment of the invention. Referring to FIG. 2, there is shown a power distribution block 200 and a plurality of voltage islands 212, 214, . . . , 216. The voltage island 212 may be referred to as a primary voltage island, and the voltage islands 214, . . . , 216 may be referred to as secondary voltage islands. The power distribution block 200 may comprise suitable logic, circuitry, and/or code that may enable independently distributing power to the voltage islands 212, 214, . . . , 216. The circuitry described in FIG. 2 may be a portion of the electronic device 100.

For example, the voltage island 212 may comprise core circuitry that may be powered up initially before other functional blocks are powered up. For example, the voltage island 212 may comprise the processor 122 and the memory 124, the voltage island 214 may comprise transmit circuitry, and the voltage island 216 may comprise receive circuitry. Other parts of the electronic device 100 may be allocated to one of the voltage islands 214 . . . 216. Accordingly, when the electronic device 100 is first turned on, the power distribution block 200 may provide voltage to the voltage island 212 to enable the electronic device to boot. The voltage for the voltage island 212 may be derived from, for example, a low current voltage Vaux.

At a later time, for example, voltage may be provided to the voltage islands 214 and 216 to operate a transmission portion of the electronic device 100. The voltage island 214 may comprise, for example, portions of the baseband processor 112 that may be needed for processing data to be transmitted and the transmitter front end 114. The voltage island 216 may comprise, for example, portions of the baseband processor 112 that may be needed for processing received data and the receiver front end 116. Accordingly, when the electronic device 100 is operating, voltage may be provided to the voltage island 212 via the low current voltage Vaux. Power may also be provided to the voltage islands 214 . . . 216 via the high current voltage Vmain when Vmain becomes available. Vmain may be deemed available, for example, when voltage of Vmain is above a threshold voltage. The voltage select signal Vsel may be asserted, for example, to indicate that the voltage islands 212 . . . 216 may be powered. The external voltage select signal Externa_Vsel may also be asserted to indicate that the voltage islands 212 . . . 216 may have power.

Figure 3A:
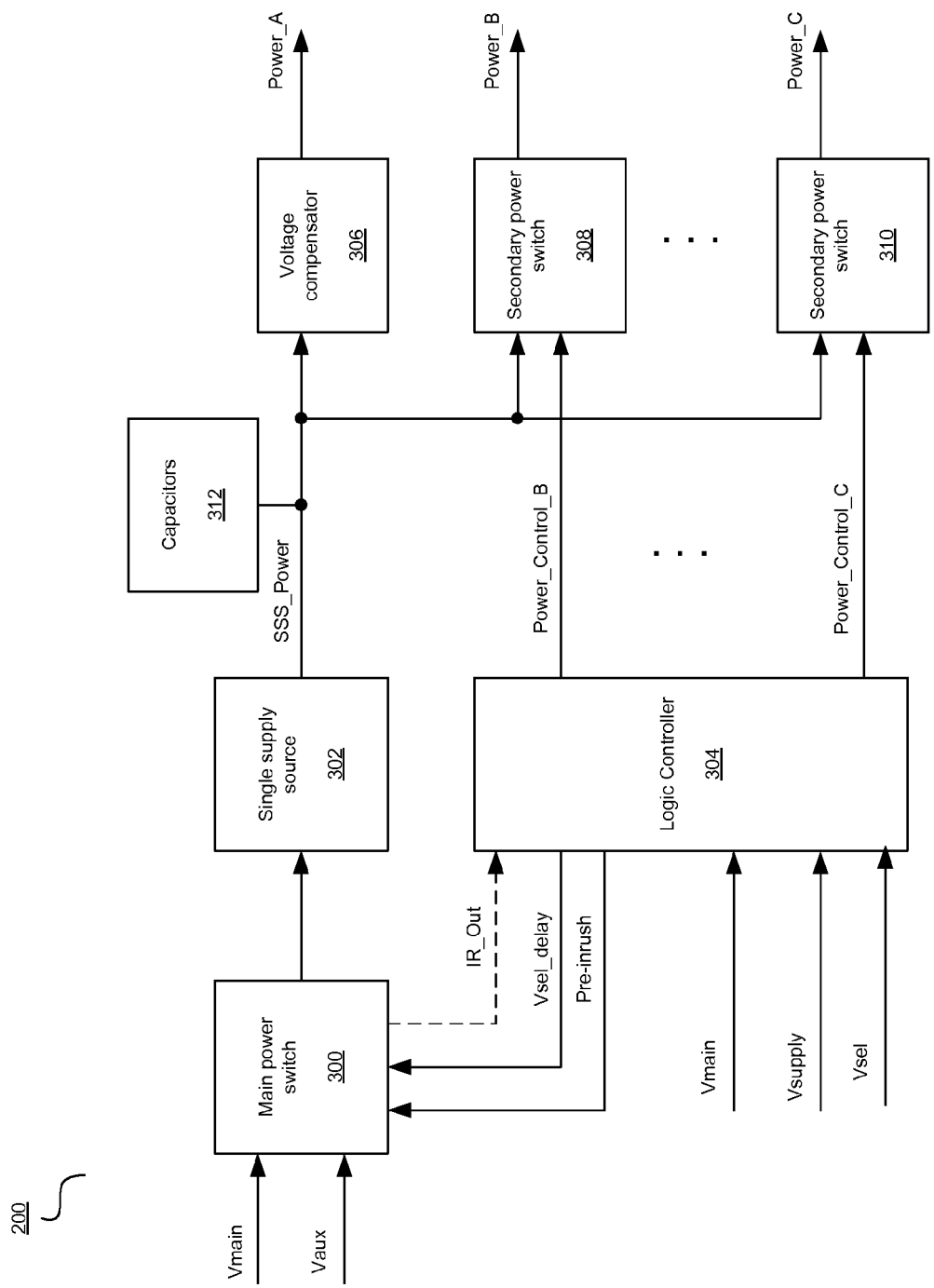
FIG. 3A is a block diagram of an exemplary power distribution block, in accordance with an embodiment of the invention.

FIG. 3A is a block diagram of an exemplary power distribution block, in accordance with an embodiment of the invention. Referring to FIG. 3A, there is shown a main power switch 300, a single supply source 302, a logic controller 304, a voltage compensator 306, secondary power switches 308, . . . , 310, and a capacitor block 312. The main power switch 300 may comprise suitable logic and/or circuitry that may enable outputting a voltage supply from a plurality of input voltage supplies, such as, for example, Vaux and Vmain.

The auxiliary voltage Vaux may be a low current voltage that may be a stable voltage source before the high current voltage Vmain is available. Accordingly, Vaux may be used to power circuitry that may be needed for initial stages of power up for an electronic device. For example, Vaux may be used to supply power to the voltage island 212. Vmain may be a high current power supply that, when stable, may be available to supply power, for example, to the voltage islands 212, . . . , 216.

The single supply source 302 may comprise suitable logic, circuitry, and/or code that may be used, for example, for converting an input voltage to a desired output voltage. For example, the input voltage may be supplied by the main power switch 300. The single supply source 302 may comprise, for example, a DC/DC converter. The output of the single supply source 302 may be referred to, for example, as SSS_Power. The logic controller 304 may comprise suitable logic, circuitry, and/or code that may enable controlling of power to the secondary power switches 308, . . . , 310. The output of the logic controller 304 may be referred to as, for example, Power_Control_N, where "N" may indicate a specific secondary power switch. For example, Power_Control_B may control whether the secondary power switch 308 outputs Power_B to the voltage island 214.

The voltage compensator 306 may comprise suitable logic and/or circuitry that may enable compensating for momentary sags in voltage. Since there might be non-perfect secondary switches on the supply path to the secondary voltage islands there could be a difference in voltage between the primary island supply and the secondary islands' supply during normal operation. The voltage sag may also occur, for example, when voltage is provided to various voltage islands 214 . . . 216. The initial inrush of current for the voltage islands 214, . . . , 216 may temporarily reduce current to the voltage compensator 306, thereby reducing voltage. This reduction in voltage may be referred to as a voltage sag. The secondary power switches 308, . . . , 310 may comprise suitable logic, circuitry, and/or code that may enable providing control over supply of power to the voltage islands 214, . . . , 216. The capacitor block 312 may comprise one or more capacitors that may be used to keep voltage output of the single supply source 302 from fluctuating as voltages to the various voltage islands 214, . . . , 216 are switched on and off.

An exemplary power distribution scenario may comprise, for example, the low current voltage Vaux being supplied to power-up a core functionality of a system. The low current power Vaux may be processed by the main power switch 300, the single supply source 302, and the voltage compensator 306 before being supplied to the voltage island 212. There may be a current limit restriction on Vaux, where the current limit may be, for example, defined by a standard such as PCI or system hardware architecture.

After the low current voltage Vaux becomes stable, the high current voltage Vmain may ramp up. When the high current voltage Vmain is valid and detected by the logic controller 304, the logic controller 304 may indicate to the main power switch (MPS) 300 to use the high current voltage Vmain to supply power to the voltage islands 212, . . . , 216. The logic controller 304 may enable power to be supplied to the different voltage islands 214, . . . , 216 by controlling the secondary power switches 308, . . . , 310. The capacitor block 312 may serve to provide bulk capacitive storage to store energy to reduce voltage ripples in the power SSS_Power output by the single supply source 302. The voltage ripples may be, for example, a result of dynamic current demands by the various voltage islands 212, . . . , 216. Controlling inrush currents for the secondary voltage islands 214, . . . , 216 may also reduce a need for capacitive filtering provided by the capacitor block 312. Accordingly, the capacitor block 312 may be smaller than if there was no inrush current control.

If the high current voltage Vmain now disappears for some reason, the electronic device 100 may go to a low power consumption mode and switch off power to the voltage islands 214, . . . , 216. Accordingly, power may be provided to the voltage island 212 in a low power consumption mode. The logic controller 304 may detect, for example, that the voltage level of the high current voltage Vmain may have dropped under a threshold value, and may switch off power to the voltage islands 214, . . . , 216. A quick transition may be desired from the high current voltage Vmain to the low current voltage Vaux to reduce the amount of time that various circuitry may be supplied with under-voltage.

In some instances, the loss of power may be a prepared or expected power removal, where the electronic device 100 may be able to control the switching of power source from the high current voltage Vmain to the low current voltage Vaux. In this case, the logic controller 304 may indicate to the main power switch 300 that it may switch to using the low current voltage Vaux via a delayed voltage select signal Vsel_delay. For example, this may be indicated by deasserting the delayed voltage select signal Vsel_delay. In this case, there may be a need to be able to control a partial inrush current during switching, where the current inrush may be because there is switching from a falling voltage of the high current voltage Vmain to a stable higher voltage of the low current voltage Vaux. This may be accomplished by, for example, asserting a pre-inrush current signal Pre-Inrush, which may indicate to the main power switch 300 to limit the amount of current during switching. The current limiting may be referred to as a soft-start.

In other instances, the loss of power may be an unprepared or unexpected power loss. In this case, the main power switch 300 may disconnect power to the voltage islands 212, . . . , 216. This power gap may result in a power-on reset for the electronic device 100. The main power switch 300 may then reinitiate power to the voltage island 212 by auto-switching to the low current voltage Vaux, or a soft-start, in order to not overload the low current voltage Vaux. Power loss may also be indicated by the MPS 300, where a current inrush signal IR_Out may be asserted by the MPS 300. The asserted current inrush signal IR_Out may indicate to the logic controller 304 to block supply of power to the secondary voltage islands 214, . . . , 216 to initiate the soft-start.

Figure 3B:
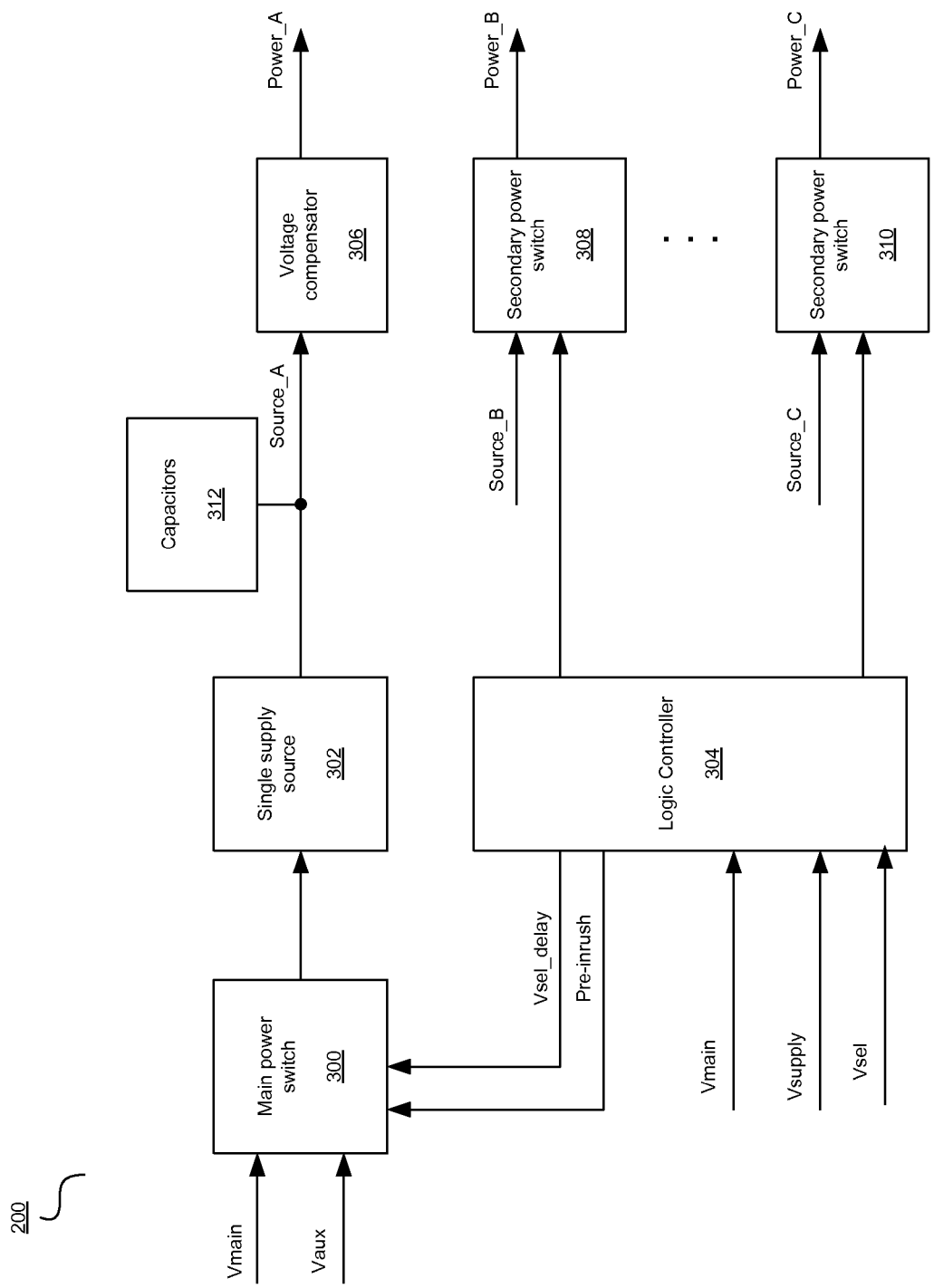
FIG. 3B is a block diagram of an exemplary power distribution block, in accordance with an embodiment of the invention.

FIG. 3B is a block diagram of an exemplary power distribution block, in accordance with an embodiment of the invention. Referring to FIG. 3B, there is shown a block diagram similar to the block diagram shown in FIG. 3A. However, this exemplary diagram shows the voltage compensator 306, and the secondary power switches 308, . . . , 310 receiving possibly different voltages as inputs. The voltage compensator 306 may provide appropriate voltage compensation to provide an output voltage that may be within tolerance, for example, when the input voltage to the voltage compensator 306 is not within tolerance. This may be needed, for example, at lower voltage levels where the input voltage Source_A for the voltage compensator 306 may not have a required tolerance of the output voltage Power_A of the voltage compensator 306.

Accordingly, the voltage islands 212, . . . , 216 may be supplied with different voltages that may be voltage compensated depending on the voltages supplied to the voltage compensator 306, and the secondary power switches 308, . . . , 310. For example, the voltage island 212 may be supplied 1 volt by the voltage compensator 306, while the voltage islands 214, . . . , 216 may be supplied 2.5 volts by the secondary power switches 308, . . . , 310. In this example, the input voltages Source_B . . . Source_C for the secondary power switches 308 . . . 310 may be within appropriate tolerances for power required for the secondary islands 214 . . . 216. Accordingly, a voltage compensator may not be needed to output the voltages Power_B . . . Power_C for the secondary islands 214 . . . 216, while the voltage compensator 306 may be needed to output the voltage Power_A for the main island 212.

Figure 4:
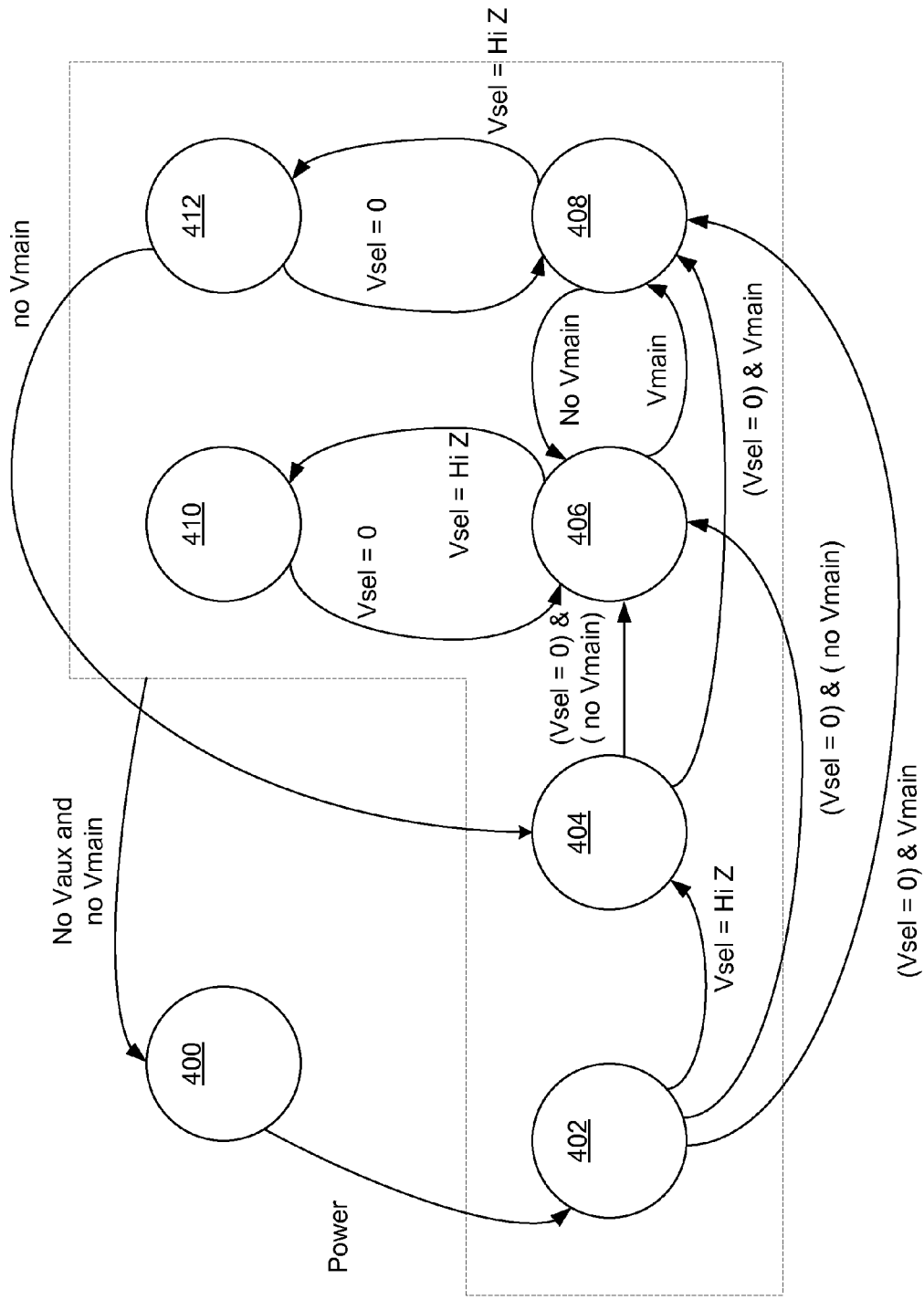
FIG. 4 is an exemplary state diagram for supplying power to two voltage islands, in accordance with an embodiment of the invention.

FIG. 4 is an exemplary state diagram for supplying power to two voltage islands, in accordance with an embodiment of the invention. Referring to FIG. 4, there is shown states 400 to 412. State 400 may be an initial state when there is no power to an electronic system, such as, for example, the electronic device 100. There may be a transition from state 400 to state 402 when power is first available. State 402 may be a state where the electronic device 100 may be initialized. There may be a transition from state 402 to state 404, 406, or 408.

The transition from state 402 to state 404 may occur when the voltage select signal Vsel is asserted and the high current voltage Vmain is not available. This state may be entered, for example, during power-up initiation condition when logic is not actually driving the voltage select signal Vsel. The transition from state 402 to state 406 may occur when the voltage select signal Vsel is deasserted and the high current voltage Vmain is not available. An asserted voltage select signal Vsel may indicate that, for example, the voltage islands 212, . . . , 216 may have power. The transition from state 402 to state 408 may occur when the voltage select signal Vsel is deasserted and there is high current voltage Vmain available.

State 404 may be a state where the voltage select signal Vsel is asserted and there is no high current voltage Vmain available. Since an asserted voltage select signal Vsel may indicate that the voltage islands 212, . . . , 216 may have power, this state may indicate an error condition. There may be a transition from state 404 to state 406 or state 408. The transition from state 404 to state 406 may occur when the voltage select signal Vsel is deasserted and the high current voltage Vmain is not available. The transition from state 404 to state 408 may occur when the voltage select signal Vsel is deasserted and there is high current voltage Vmain available.

State 406 may be a state where the voltage select signal Vsel may be deasserted to indicate that the voltage islands 212, . . . , 216 may not all have power, and the high current voltage Vmain is not yet available. There may be a transition from state 406 to state 408 or state 410. There may be a transition from state 406 to state 408 when the high current voltage Vmain is available. The transition from state 406 to state 410 may occur when the voltage select signal Vsel is asserted.

State 408 may be a state where the voltage select signal Vsel may be deasserted to indicate that not all of the voltage islands 212, . . . , 216 may have power, and the high current voltage Vmain is available. There may be a transition from state 408 to state 406 or state 412. The transition from state 408 to state 406 may occur when the high current voltage Vmain is no longer available. The transition from state 408 to state 412 may occur when the voltage select signal Vsel is asserted.

State 410 may be a state where the voltage select signal Vsel may be asserted to indicate that the voltage islands 212, . . . , 216 may have power, and the high current voltage Vmain is not yet available. Accordingly, this may be an error state since if the high current voltage Vmain is not available, the voltage islands 214, . . . , 216 should not have power. There may be a transition from state 410 to state 406 when the voltage select signal Vsel may be deasserted.

State 412 may be a state where the voltage select signal Vsel is asserted, and the high current voltage Vmain is available. Accordingly, the voltage islands 212, . . . , 216 may be provided power derived from the high current voltage Vmain. There may be a transition from state 412 to state 404 or state 408. The transition from state 412 to state 404 may occur when the high current voltage Vmain is not available. The transition from state 412 to state 408 may occur when the voltage select signal Vsel is deasserted.

Accordingly, when the electronic device 100 is turned off, for example, the initial state may be state 400. When the electronic device 100 is turned on, the next state may be state 402. If the voltage select signal Vsel is asserted in state 402, the next state may be state 404. The voltage select signal Vsel being asserted after power up may indicate, for example, that initialization of various circuitry may not yet have finished. An asserted signal may be a tri-stated signal that is pulled high by a pull-up resistor or other circuitry.

While in state 404, if the voltage select signal Vsel is deasserted, for example, by being in a low voltage level state, and if the high current voltage Vmain is not available, the next state may be state 406. Also, while in state 404, if the voltage select signal Vsel is deasserted, and the high current voltage Vmain is available, the next state may be state 408. In state 406, power may still be provided to the primary voltage island 212, while the secondary voltage islands 214, . . . , 216 may not yet have power. If, while in state 406, the voltage select signal Vsel is asserted, the next state may be state 410. If, while in state 406, the high current voltage Vmain is available, the next state may be state 408. In state 410, power may still be supplied to the primary voltage island 212. When the voltage select signal Vsel is asserted again, the next transition may be back to state 406. If while in state 406, the high current voltage Vmain becomes available, the next state may be state 408.

In state 408, power may be provided to the primary voltage island 212 and the secondary voltage islands 214, . . . , 216. If while in state 408, the high current voltage Vmain becomes unavailable, the next state may be state 406. If while in state 408, the voltage select signal Vsel is asserted, the next state may be state 412. Power may be provided to the primary voltage island 212 and the secondary voltage islands 214, . . . , 216 in state 412.

If, while in state 412, the high current voltage Vmain becomes unavailable, the next state may be state 404. Transitioning to state 404 may result in a power-on reset signal being generated. If, while in state 412, the voltage select signal Vsel is deasserted, the next state may be state 408. If both the low current voltage Vaux and the high current voltage Vmain are lost while in any of the states 402, 404, 406, 408, 410, and 412, the next state may be state 400.

Figure 5A:
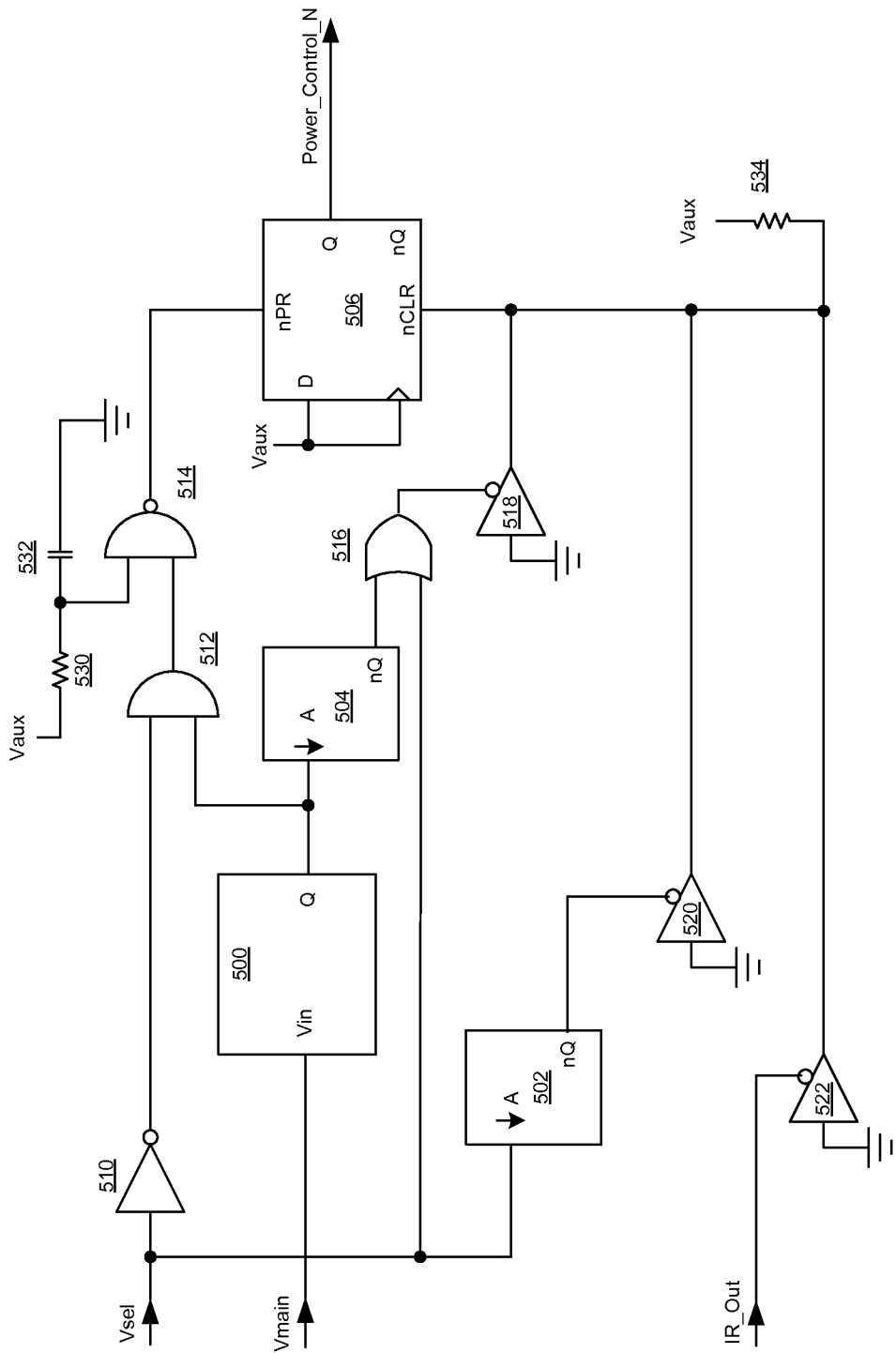
FIG. 5A is a circuit diagram illustrating an exemplary hardware implementation for supplying power to two voltage islands, in accordance with an embodiment of the invention.

FIG. 5A is a circuit diagram illustrating an exemplary hardware implementation for supplying power to two voltage islands, in accordance with an embodiment of the invention. Referring to FIG. 5A, there is shown a portion of the logic controller 304 that may comprise a power detection block 500, one-shots 502 and 504, a flip-flop (F/F) 506, an inverter 510, an AND gate 512, a NAND gate 514, an OR gate 516, and tri-state buffers 518, 520, and 522. There is also shown a resistor 530 and a capacitor 532, and a pull-up resistor 534.

The power detection block 500 may comprise suitable logic and/or circuitry that may enable generation of, for example, an active low pulse when an input signal rises above a certain threshold from a low voltage level, and also when the input signal falls below another threshold from a high voltage level. The circuitry in FIG. 5A may be powered by, for example, the low current power supply Vaux.

In operation, the inputs may be, for example, the high current voltage Vmain, the voltage select signal Vsel, and a current inrush signal IR_OUT, which may be generated by, for example, the MPS 300. Initially, when there is no power available, the logic controller 304 may be in state 400. When power to the logic controller 304, such as the low current voltage Vaux, becomes available, the state transition may be from state 400 to state 402. The resistor 530 and the capacitor 532 may delay a rise time of a voltage level to an input of the AND gate 514. This may prevent the preset input nPR and the clear input nCLR of the F/F 506 from being asserted by low signals at the same time, since that may lead to an unknown initial condition for the Q output. Accordingly, the clear input nCLR may be at a low voltage level and then transition to a high voltage level while the NAND gate 514 may provide a high voltage level signal to the nPR input of the F/F 506. Therefore, the Q output of the F/F 506, which may be the signal Power_Control_N, may be initialized to a low voltage level state, thereby disabling supply of power to a voltage island N.

If the voltage select signal Vsel remains deasserted and there is no high current voltage Vmain available, the transition may be from state 402 to state 404. Since the output of the AND gate 512 may be at a low voltage level, the output of the NAND gate 514 may be at a high voltage level. Accordingly, the signal Power_Control_N at the output of the F/F 506 may remain at a low voltage level, and the power may not be supplied to the voltage island N.

If the voltage select signal Vsel is deasserted but the high current voltage Vmain is not available, the transition may be from state 402 to state 406, from state 404 to state 406, or from state 410 to state 406. Since the high current voltage Vmain is not available, the output of the power detection block 500 may remain at a low voltage level. Accordingly, the output of the AND gate 512 may be low, and the output of the NAND gate 514 may also be at a high voltage level. Therefore, the signal Power_Control_N at the output of the F/F 506 may remain at a low voltage level, and power may not be supplied to the voltage island N.

If the voltage select signal Vsel is deasserted and the high current voltage Vmain is available, the transition may be from state 402 to state 408, from state 404 to state 408, or from state 406 to state 408. Since the high current voltage Vmain is available, the output of the power detection block 500 may be at a high voltage level. Accordingly, the output of the AND gate 512 may be at a high voltage level, and the output of the NAND gate 514 may be at a low voltage level. Therefore, the signal Power_Control_N at the output of the F/F 506 may be preset to a high voltage level, and power derived from the high current voltage Vmain may be supplied to the voltage island N.

If the voltage select signal Vsel is deasserted and the high current voltage Vmain is available, then subsequently becomes unavailable, the transition may be from state 408 to state 406. The power detection block 500 may detect falling of the high current voltage Vmain, and accordingly may generate a low voltage level that may be communicated to the one-shot 504. The one-shot 504 may detect the falling edge communicated by the power detection block 500, and may communicate an active low pulse to the OR gate 516. Since the voltage select signal Vsel may still be deasserted, the output of the OR gate 516 may be at a low voltage level, and this may be used to enable the tri-state buffer 518. The low voltage level signal at the output of the tri-state buffer 518 may clear the F/F 506. Accordingly, the signal Power_Control_N may be at a low voltage level, and power may not be supplied to the voltage island N.

If the high current voltage Vmain is available and the voltage select signal Vsel is deasserted, and then the voltage select signal Vsel is asserted, the transition may be from state 408 to state 412. The one-shot 502 may not trigger since the output of the inverter 510 may be a rising edge. Additionally, since the output of the AND gate 512 may be at a low voltage level, the output of the NAND gate 514 may be at a high voltage level, which has no effect on the preset input of the F/F 506. Accordingly, the signal Power_Control_N may remain at a high voltage level, and power may be supplied to the voltage island N.

If the high current voltage Vmain is available, and the voltage select signal Vsel goes from being asserted and to being deasserted, the transition may occur from state 412 to state 408. The AND gate 512 may output a high voltage level signal, and the NAND gate 514 may output a low voltage level signal. The low voltage level signal output by the NAND gate 514 may preset the F/F 506. Accordingly, the signal Power_Control_N may be at a high voltage level, and power derived from the high current voltage Vmain may be supplied to the voltage island N.

If the high current voltage Vmain is not available, and the voltage select signal Vsel is asserted and then becomes deasserted, the transition may be from state 406 to state 410. The one-shot 502 may detect the falling edge of the voltage select signal Vsel, and accordingly may generate an active low pulse that may enable the tri-state buffer 520. The low voltage level signal at the output of the tri-state buffer 520 may clear the F/F 506. Accordingly, the signal Power_Control_N may be at a low voltage level, and power may not be supplied to the voltage island N.

If the voltage select signal Vsel is asserted, and the high current voltage Vmain is available, then subsequently becomes unavailable, the transition may be from state 412 to state 404. Since the voltage select signal Vsel may not be asserted, the output of the NAND gate 514 and the output of the OR gate 516 may be at a high voltage level. Accordingly, the signal Power_Control_N at the Q output of the F/F 506 may not change. Since, in state 412, the signal Power_Control_N may have been be at a low voltage level, and power may not be supplied to the voltage island N, the signal Power_Control_N may remain at a low voltage level in the transition to state 404.

An exemplary logic controller 304 may also use current inrush signal IR_Out from the MPS 300. The current inrush signal IR_Out may be, for example, an indication by the MPS 300 that there was an unexpected loss of the high current voltage Vmain. Accordingly, when the current inrush signal IR_Out is asserted to a low voltage level, it may enable the tri-state buffer 522. The tri-state buffer 522 may then output a low voltage level signal that may be used to clear the F/F 506. Accordingly, the signal Power_Control_N may be deasserted, and the voltage island N may not be supplied with power.

Figure 5C:
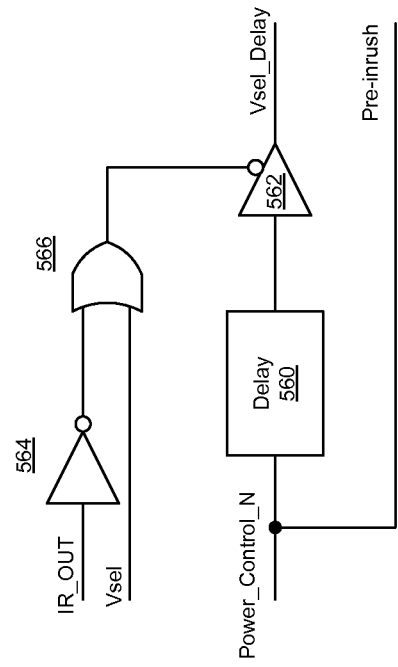
FIG. 5C is a block diagram illustrating an exemplary circuit for generating a voltage select delay signal, in accordance with an embodiment of the invention.
Figure 5B:
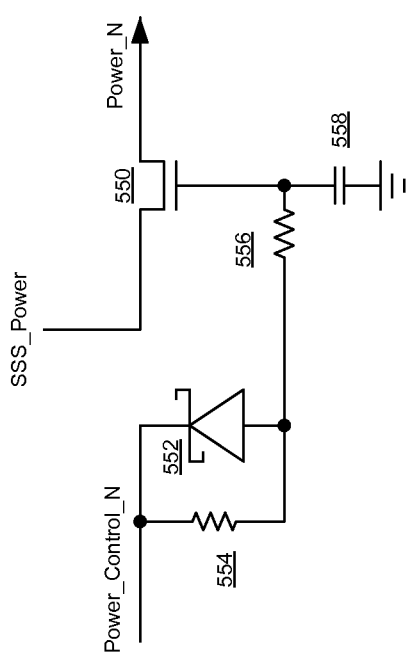
FIG. 5B is a block diagram illustrating an exemplary secondary power switch for a voltage island, in accordance with an embodiment of the invention.

FIG. 5B is a block diagram illustrating an exemplary secondary power switch for a voltage island, in accordance with an embodiment of the invention. Referring to FIG. 5B, there is shown a NMOS transistor 550, a diode 552, resistors 554 and 556, and a capacitor 558. In operation, when the signal Power_Control_N is asserted to a high voltage level, the diode 552 may be reverse biased. The gate of the NMOS transistor 550 may charge slowly to a high voltage level via the resistors 554 and 556 and the capacitor 558. The NMOS transistor 550 may then conduct the current provided by the SSS_power such that Power_N may be provided to the voltage island N. The SSS_Power may be, for example, generated by the single supply source 302 from the high current voltage Vmain.

When the signal Power_Control_N is deasserted to a low voltage level, the diode 552 may be forward biased. If the diode 552 is, for example, a Schottky diode, the forward voltage drop may be small and the transition time to go from being reverse biased to forward biased may be small. Accordingly, the voltage at the gate of the NMOS transistor 550 may be able to be discharged quickly to reduce loading on the single supply source 302. For example, this may be useful when the high current voltage Vmain is lost and power is switched to be derived from the low current voltage Vaux. The discharge time may be dependent on the size of the resistor 556.

The charge time due to the resistors 554 and 556, and the capacitor 558 may allow, for example, a slow turn-on for the NMOS transistor 550 that may reduce current and/or voltage spikes due to sudden transfer of current through the NMOS transistor 550. An embodiment of the invention may comprise, for example, a resistance of 100 K-ohms for the resistor 554, a resistance of 100 ohms for the resistor 556, and a capacitance of 0.1 micro-farads for the capacitor 558.

While a NMOS transistor may have been shown for exemplary purposes, the invention need not be so limited. For example, a PMOS transistor may be used with appropriate supporting circuitry to turn on and off the PMOS transistor. Some embodiments of the invention may comprise designing a gate discharge time of the NMOS transistor 550, or an equivalent PMOS transistor, that may range substantially from 1-10 uS. Various embodiments of the invention may specify, for example, that if the NMOS transistor 550 is used, Vgate−Vin>Vgs. Vin may be the voltage at the terminal that receives SSS_Power and Vgs may be the voltage from the gate terminal to the terminal that outputs Power_N. Other embodiments of the invention may specify, for example, that if a PMOS transistor is used, Vout>Vgs, where Vout may be the voltage at the terminal that outputs Power_N.

FIG. 5C is a block diagram illustrating an exemplary circuit for generating a voltage select delay signal, in accordance with an embodiment of the invention. Referring to FIG. 5C, there is shown a delay block 560, a tri-state buffer 562, an inverter 564, and an OR gate 566. In operation, the signal Power_Control_N may be communicated to the MPS 300 as the pre-inrush current signal Pre_Inrush. The signal Pre_Inrush may be used, for example, where there is switching from a falling voltage of the high current voltage Vmain to a stable higher voltage of the low current voltage Vaux. This may be accomplished by, for example, asserting a pre-inrush current signal Pre-Inrush, which may indicate to the MPS 300 to limit the amount of current during switching.

The delayed voltage select signal Vsel_delay may be used to indicate loss of power during a prepared power removal, where, for example, the electronic device 100 may be able to control the switching of power source from the high current voltage Vmain to the low current voltage Vaux. In this case, the logic controller 304 may indicate to the MPS 300 to switch to using the low current voltage Vaux via a delayed voltage select signal Vsel_delay. If the current inrush signal IR_Out is at a high voltage level, for example, the output of the OR gate 566 may be controlled by the state of the voltage select signal Vsel. Accordingly, if the Vsel signal is at a low voltage level, the tri-state buffer 562 may be enabled and Vsel_delay may be a delayed version of the signal Power_Control_N. However, when there is an unprepared power loss, the signal IR_Out may be at a low voltage level. This may force the delayed voltage select signal Vsel_delay at a high voltage level regardless of the voltage select signal Vsel.

Figure 5D:
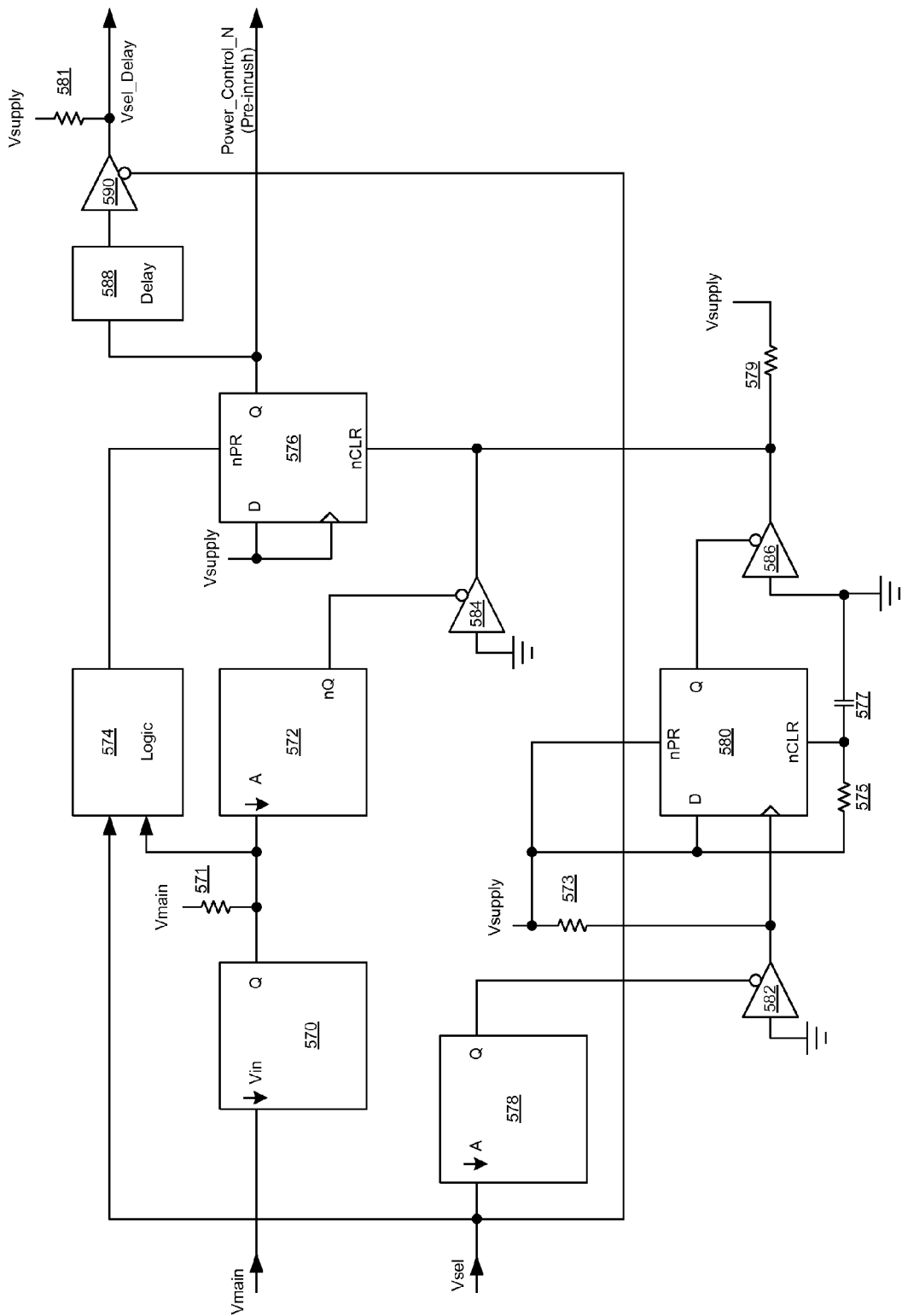
FIG. 5D is a circuit diagram illustrating an exemplary hardware implementation for supplying power to two voltage islands, in accordance with an embodiment of the invention.

FIG. 5D is a circuit diagram illustrating an exemplary hardware implementation for supplying power to two voltage islands, in accordance with an embodiment of the invention. Referring to FIG. 5D, there is shown a portion of the logic controller 304 that may comprise a power detection block 570, one-shots 572 and 578, a logic block 574, F/Fs 576 and 580, tri-state buffers 582, 584, 586, and 590, and a delay block 588. There is also shown resistors 571, 573, 575, 579, and 581, and a capacitor 577. The circuitry shown with respect to FIG. 5D may be similar to the circuitry shown with respect to FIGS. 5A-5C in that the input signals Vmain and Vsel may be processed to generate the signals Power_Select_N (Pre_Inrush) and Vsel_Delay for controlling power to the voltage islands 212 . . . 216. Accordingly, various embodiments of the invention may be used to control power to a plurality of voltage islands.

Figure 6:
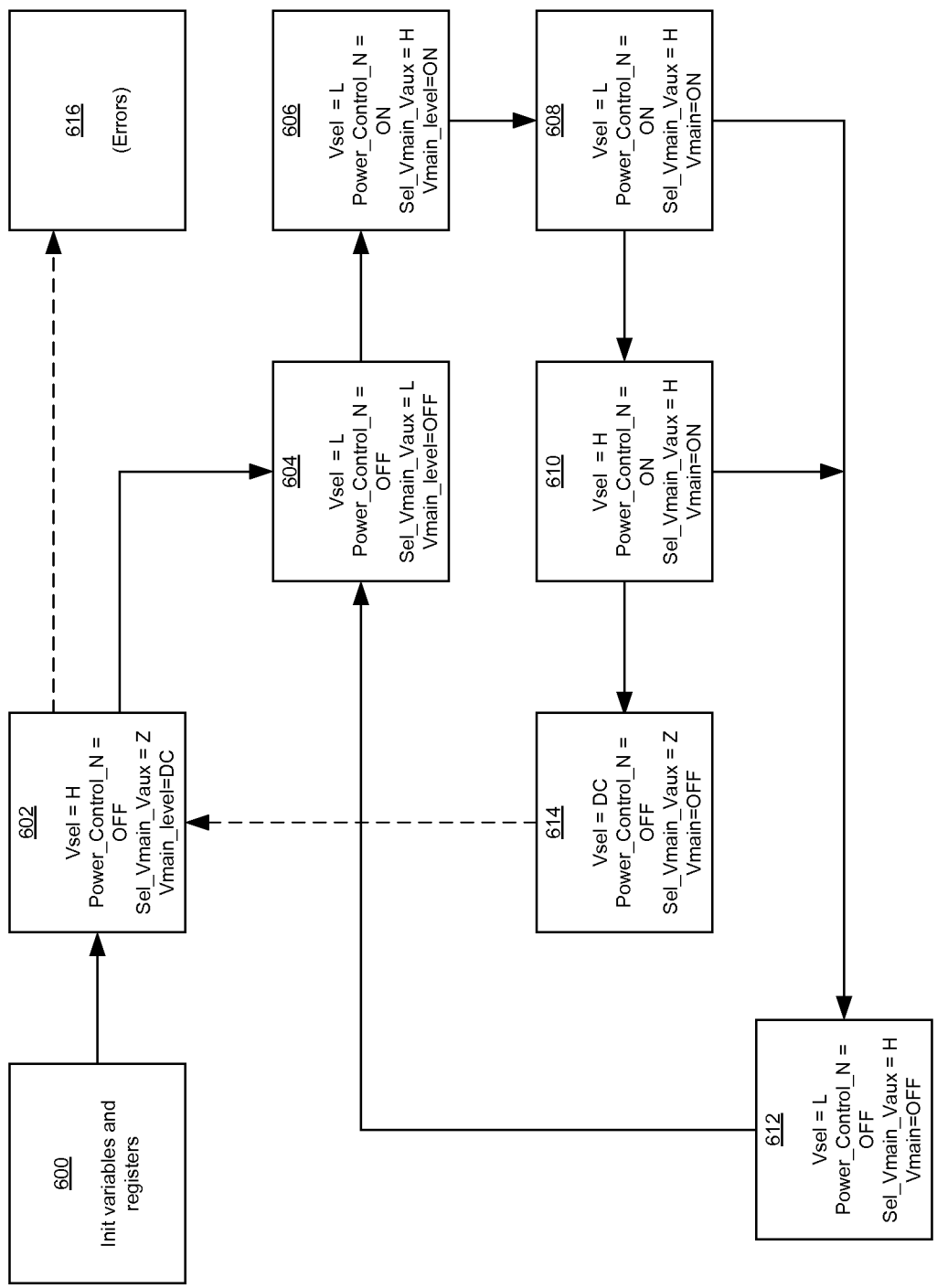
FIG. 6 is an exemplary flow chart for controlling power distribution, in accordance with an embodiment of the invention.

FIG. 6 is an exemplary flow chart for controlling power distribution, in accordance with an embodiment of the invention. Referring to FIG. 6, there is shown states 600 to 614, which may be used to describe an exemplary software algorithm that may be used to implement the logic controller 304 functionality. The software algorithm may be executed, for example, by a microcontroller. In the exemplary flow chart described with respect to FIG. 6, signals Vsel, Power_Control_N, Sel_Vmain_Vaux, and Main_Voltage may be used to keep track of state information.

The signal Vsel may be an input signal that when asserted, for example, to a high voltage level, may indicate that the electronic device 100 may be in a high power consumption state. The signal Vsel being deasserted, for example, to a low voltage level, may indicate that the electronic device 100 may be in a low power consumption state. The low power consumption state may occur when the primary voltage island 212 is supplied with power derived from the low current voltage Vaux. The high power consumption state may occur when the voltage islands 212 . . . 216 are supplied with power derived from the high current voltage Vmain. The signal Vsel may be generated by, for example, logic circuit block 126 that may determine when the voltage islands 212 . . . 216 have power.

The output signal Power_Control_N may be ON or OFF, and may determine whether power is being provided to a specific voltage island. When the output signal Power_Control_N is ON, the NMOS transistor 550 may be turned on to provide power to a voltage island. When the output signal Power_Control_N is OFF, the NMOS transistor 550 may be turned off to block power to the voltage island.

The output signal Sel_Vmain_Vaux may be communicated, for example, to the MPS 300. The signal Sel_Vmain_Vaux may be used to control power generation by the MPS 300. Deasserting the signal Sel_Vmain_Vaux to, for example, a low voltage level, may indicate to the MPS 300 to use the low current voltage Vaux. Asserting the signal Sel_Vmain_Vaux to, for example, a high voltage level may indicate to the MPS 300 that the high current Vmain may be used. The signal Sel_Vmain_Vaux may also be in a tri-stated mode. This may indicate, for example, that a power gap may be occurring in the MPS 300. The signal Main_Voltage may be an input signal that is generated from the voltage level of the high current voltage Vmain. A high voltage level for the signal Main_Voltage (ON) may indicate that the high current voltage Vmain is available, and a low voltage level for the signal Main_Voltage (OFF) may indicate that the high current voltage Vmain is not available.

State 600 may be an initialization state where signals and registers may be initialized to particular states. In state 600, the input signal Vsel may be, for example, in a tri-state mode, and thus may be pulled up to a high voltage level. The input signal Main_Voltage may be OFF since the high current voltage Vmain may not be available. The output signals Power_Control_N and Sel_Vmain_Vaux may be deasserted. There may be an unconditional transition from state 600 to state 602. In state 602, the input signal Vsel may remain in the tri-state mode and the input signal Main_Voltage may remain OFF. The output signal Power_Control_N may remain deasserted and the output signal Sel_Vmain_Vaux may be in a tri-state mode. Accordingly, the low current voltage Vaux may be used to supply power to the primary voltage island 212. When the input signal Vsel is deasserted, there may be a transition from state 602 to state 604. The input signal Vsel may be deasserted, for example, by the logic circuit block 126 that may now be operational. The deassertion of the input signal Vsel may allow transition from state 602 to state 604. Debugging may take place by transitioning from state 602 to state 616. The transitioning to state 616 may be due to, for example, errors and/or flags that may be set.

In state 604, the input signal Vsel may be deasserted and the input signal Main_Voltage may remain OFF. The output signals Power_Control_N and Sel_Vmain_Vaux may be deasserted. Accordingly, the low current voltage Vaux may be used to supply power to the primary voltage island 212. There may be a transition from state 604 to state 606 when the input signal Main_Voltage goes to ON state when the high current voltage Vmain becomes available. In state 606, the input signal Vsel may be deasserted and the input signal Main_Voltage may be ON. The output signals Power_Control_N and Sel_Vmain_Vaux may now be asserted. Accordingly, the MPS 300 may provide power to the voltage islands using the high current voltage Vmain. There may be a direct transition from state 606 to state 608.

In state 608, the input signal Vsel may be deasserted and the input signal Main_Voltage may be ON. The output signals Power_Control_N and Sel_Vmain_Vaux may now be asserted. The deasserted state of the input signal Vsel may indicate that not all the voltage islands 212, ..., 216 may have power. There may be a transition from state 608 to state 610 when the input signal Vsel is asserted. There may be a transition from 608 to state 612 when the input signal Main_Voltage is OFF.

In state 610, the input signal Vsel may be asserted and the input signal Main_Voltage may be ON. This may indicate that the voltage islands 212, ..., 216 may have power. Accordingly, the state 610 may be referred to as a "normal" state for the electronic device 100. The output signals Power_Control_N and Sel_Vmain_Vaux may now remain asserted. There may be a transition from state 610 to state 612 when the input signal Vsel is deasserted and the input signal Main_Voltage is OFF. There may be a transition from state 610 to state 614 when the input signal Vsel is asserted and the input signal Main_Voltage is OFF.

In state 612, the input signal Vsel may be deasserted and the input signal Main_Voltage may be OFF. The output signal Power_Control_N may be deasserted to shut off power to the secondary voltage islands 614 ... 616. The state 612 may be a state, for example, where a 60 uS timer may be running to give time for the NMOS transistor 550 to fully shut off. The output signal Sel_Vmain_Vaux may be deasserted. There may be a transition from state 612 to state 604 when the 60 uS timer has expired and the input signal Sel_Vmain_Vaux is deasserted.

In state 614, the state of the input signal Vsel may not matter. The input signal Main_Voltage may be OFF. The output signal Power_Control_N may be deasserted to shut off power to the secondary voltage islands 214 ... 216. The output signal Sel_Vmain_Vaux may be tri-stated. There may be a transition from state 614 to state 602 upon a power-on reset.

Figure 7:
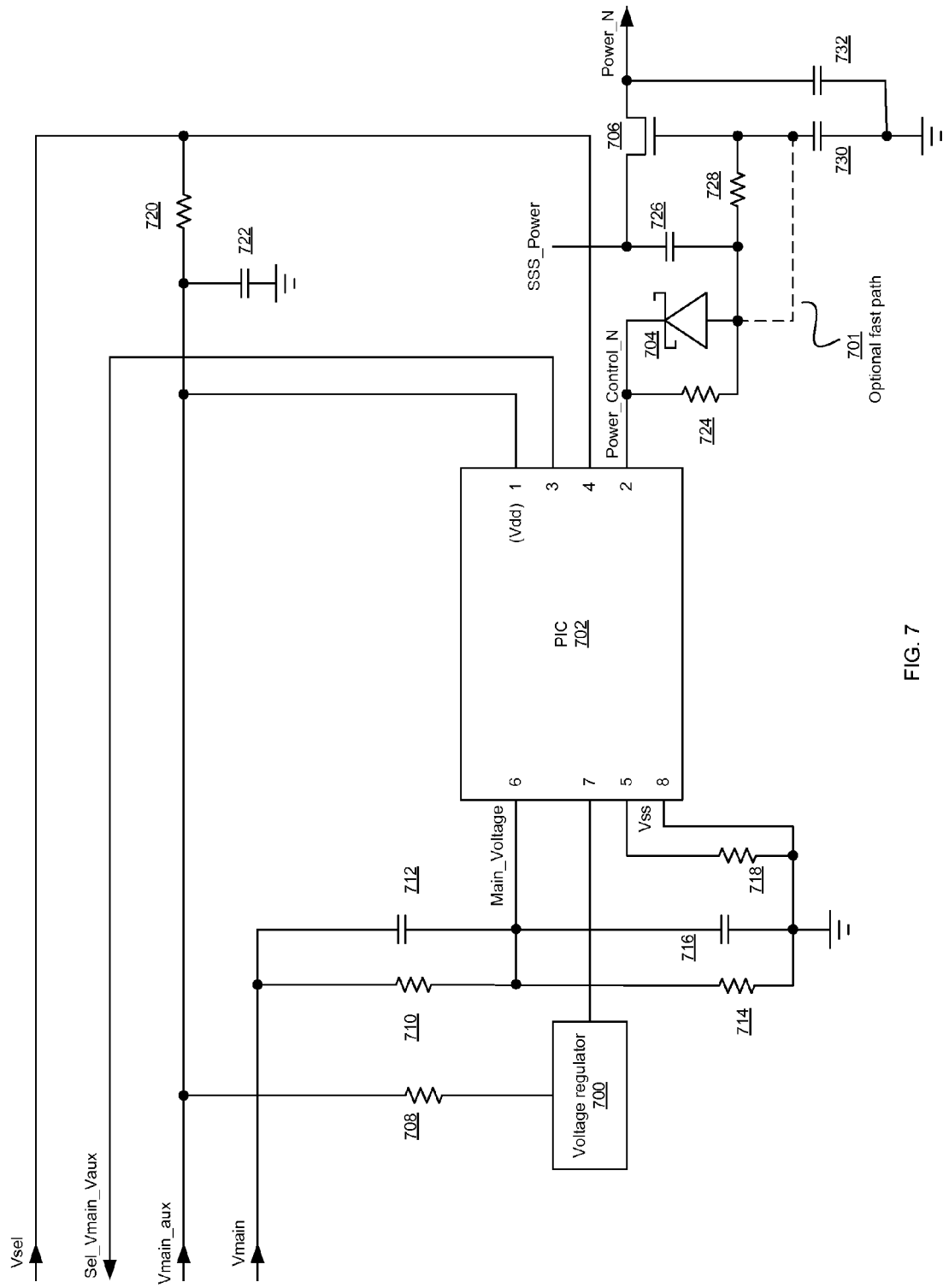
FIG. 7 is an exemplary block diagram for implementing a power distribution controller, in accordance with an embodiment of the invention.

FIG. 7 is an exemplary block diagram for implementing a power distribution controller, in accordance with an embodiment of the invention. Referring to FIG. 7, there is shown a processor 702 and supporting circuitry that may be used for execution of code that may implement the flowchart described with respect to FIG. 6. The processor 702 may be, for example, a microcontroller. The input signal Vsel may be provided to, for example, pin 4 of the processor 702. The high current voltage Vmain may be processed by the resistors 710 and 714 and capacitors 712 and 716 to provide an input signal Main_Voltage to pin 6. The voltage Vmain_aux, which may be provided by the MPS 300, may be a source of power for the processor 702. The voltage Vmain_aux may also be regulated by the voltage regulator 700 to provide a reference voltage for the processor 702. The reference voltage may be used, for example, by the processor 702 for comparison to other input signals or generated signals. Furthermore, FIG. 7 illustrates having capacitors 722, 726, 730, 732 and resistors 720, 724.

The output voltage Sel_Vmain_Vaux may be output by pin 3, for example. The output signal Power_Control_N may be output by pin 2 to control the NMOS transistor 706, which may function similarly as described with respect to FIG. 5B. Accordingly, the transistor 706 may be turned off much quicker than it is turned on. This may allow power to be supplied to a voltage island without a sudden current demand, and also power may be cut off to a voltage island quickly to facilitate switching from a falling voltage source to a stable voltage source.

Various embodiments of the invention may also allow a fast path 701 for quickly turning off the transistor 706. This may comprise, for example, a short-circuit between the gate of the transistor 706 and diode 704. Accordingly, the resistor 728 may be replaced by the fast path 701.

In accordance with an embodiment of the invention, aspects of an exemplary system may comprise, for example, the power distribution block 200, the logic circuit block 126, and/or the processor 122, that may enable providing power to, for example, the primary voltage island 212. The power distribution block 200, the logic circuit block 126, and/or the processor 122 may also allow individually controlling providing of power to each of the secondary voltage islands 214 ... 216. The power to the voltage islands 212 ... 216 may be blocked and/or unblocked by the power distribution block 200.

The power distribution block 200 may enable supplying a common voltage to the voltage islands 212 ... 216. The power distribution block 200, the logic circuit block 126 may also determine when the common voltage may drop below a threshold voltage. The power distribution block 200 may also enable supplying different voltages to the voltage islands 212 ... 216, where each of the voltage islands 212 ... 216 may be supplied with one of the different voltages. The power distribution block 200 may indicate to the primary power supply, for example, the MPS 300, to switch to the low current voltage source Vaux to provide the power for the primary voltage island 212. The power distribution block 200 may then block power to the secondary voltage islands 214 ... 216.

The NMOS transistor 550 may turn off to block power faster than it may turn on to unblock power, as described with respect to FIG. 5B. The power distribution block 200 may provide power to the primary voltage island 212 before providing power to the secondary voltage islands 214 . . . 216. This may be because the low current voltage Vaux may be stable before the high current voltage Vmain is stable. The power distribution block 200 may also comprise bulk capacitive storage, for example, via the capacitor block 312, for the power provided to the primary voltage island 212 and/or the secondary voltage islands 214 . . . 216.

Power may be supplied to each of the secondary voltage islands 214 . . . 216 via, for example, one of secondary power switches 308 . . . 310. The secondary power switch may comprise a power NMOS transistor or a power PMOS transistor. The power distribution block 200 may enable communicating a signal to the MPS 300 that may indicate a current rush due to power being supplied to the plurality of voltage islands.

Another embodiment of the invention may provide a machine-readable storage, having stored thereon, a computer program having at least one code section executable by a machine, thereby causing the machine to perform the steps as described above for supplying power to multiple voltage islands using a single supply source.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

The invention claimed is:

1. A method comprising:
supplying power to a first portion of a plurality of voltage islands to power up at least one component in an electronic device, the at least one component coupled to the first portion of the plurality of voltage islands, the power supplied from one of a plurality of input voltage signals, the plurality of input voltage signals including at least one of: a main voltage source or an auxiliary voltage source;
individually controlling, based at least in part upon a voltage level of at least one of the plurality of input voltage signals and a mode of the electronic device, power to at least one remaining portion of the plurality of voltage islands to power up at least one component coupled to the at least one remaining portion of the plurality of voltage islands;
supplying the power from the auxiliary voltage source to the first portion of the plurality of voltage islands prior to the at least one remaining portion of the plurality of voltage islands being supplied with power; and
blocking the power to the at least one remaining portion of the plurality of voltage islands.

2. The method according to claim 1, further comprising:
supplying a common voltage to the plurality of voltage islands.

3. The method according to claim 2, wherein the mode of the electronic device includes one of: a high power consumption state or a low power consumption state.

4. The method according to claim 1, further comprising:
detecting when the power supplied is the auxiliary voltage source; and
selecting the auxiliary voltage source to supply the power for the first portion of the plurality of voltage islands.

5. The method according to claim 1, further comprising:
blocking power to the first portion of the plurality of voltage islands after a predefined delay.

6. The method according to claim 1, wherein the mode of the electronic device includes one of: a high power consumption state or a low power consumption state.

7. The method according to claim 6, further comprising:
selecting the auxiliary voltage source to supply the power for the first portion of the plurality of voltage islands when the mode is in the low power consumption state, wherein
the power to the at least one remaining portion of the plurality of voltage islands is blocked when the mode is in the low power consumption state.

8. The method according to claim 6, further comprising:
selecting the main voltage source to supply the power for the first portion of the plurality of voltage islands when the mode is in the high power consumption state; and
selecting the main voltage source to supply the power to the at least one remaining portion of the plurality of voltage islands when the mode is in the high power consumption state.

9. A system comprising:
circuitry configured to:
supply power to a first portion of a plurality of voltage islands to power up at least one component in an electronic device, the at least one component coupled to the first portion of the plurality of voltage islands, the power supplied from one of a plurality of input voltage signals, the plurality of input voltage signals including at least one of: a main voltage source or an auxiliary voltage source;
individually control, based at least in part upon a voltage level of at least one of the plurality of input voltage signals and a mode of the electronic device, power to at least one remaining portion of the plurality of voltage islands to power up at least one component coupled to the at least one remaining portion of the plurality of voltage islands;
supply the power from the auxiliary voltage source to the first portion of the plurality of voltage islands prior to the at least one remaining portion of the plurality of voltage islands being supplied with power; and block the power to the at least one remaining portion of the plurality of voltage islands.

10. The system of claim 9, wherein the circuitry is configured to supply a common voltage to the plurality of voltage islands.

11. The system of claim 10, wherein the mode of the electronic device includes one of: a high power consumption state or a low power consumption state.

12. The system of claim 9, wherein the circuitry is configured to:
detect when the power supplied is the auxiliary voltage source; and
select the auxiliary voltage source to supply the power for the first portion of the plurality of voltage islands.

13. The system of claim 9, wherein the circuitry is configured to:
block power to the first portion of the plurality of voltage islands after a predefined delay.

14. The system of claim 9, wherein the mode of the electronic device includes one of: a high power consumption state or a low power consumption state.

15. The system of claim 14, wherein:
the circuitry is configured to select the auxiliary voltage source to supply the power for the first portion of the plurality of voltage islands when the mode is in the low power consumption state; and
the power to the at least one remaining portion of the plurality of voltage islands is blocked when the mode is in the low power consumption state.

16. The system of claim 14, wherein the circuitry is configured to:
select the main voltage source to supply the power for the first portion of the plurality of voltage islands when the mode is in the high power consumption state; and
select the main voltage source to supply the power to the at least one remaining portion of the plurality of voltage islands when the mode is in the high power consumption state.

17. A non-transitory computer readable medium having a computer program recorded thereon, the computer program configured to perform a method when executed on a computer, the method comprising:
supplying power to a first portion of a plurality of voltage islands to power up at least one component in an electronic device, the at least one component coupled to the first portion of the plurality of voltage islands, the power supplied from one of a plurality of input voltage signals, the plurality of input voltage signals including at least one of: a main voltage source or an auxiliary voltage source;
individually controlling, based at least in part upon a voltage level of at least one of the plurality of input voltage signals and a mode of the electronic device, power to at least one remaining portion of the plurality of voltage islands to power up at least one component coupled to the at least one remaining portion of the plurality of voltage islands;
supplying the power from the auxiliary voltage source to the first portion of the plurality of voltage islands prior to the at least one remaining portion of the plurality of voltage islands being supplied with power; and
blocking the power to the at least one remaining portion of the plurality of voltage islands.

18. The non-transitory computer readable medium according to claim 17, wherein the method further comprises:
supplying a common voltage to the plurality of voltage islands.

19. The non-transitory computer readable medium according to claim 18, wherein the mode of the electronic device includes one of: a high power consumption state or a low power consumption state.

20. The non-transitory computer readable medium according to claim 17, wherein the method further comprises:
detecting when the power supplied is the auxiliary voltage source; and
selecting the auxiliary voltage source to supply the power for the first portion of the plurality of voltage islands.

* * * * *